Figure 1:
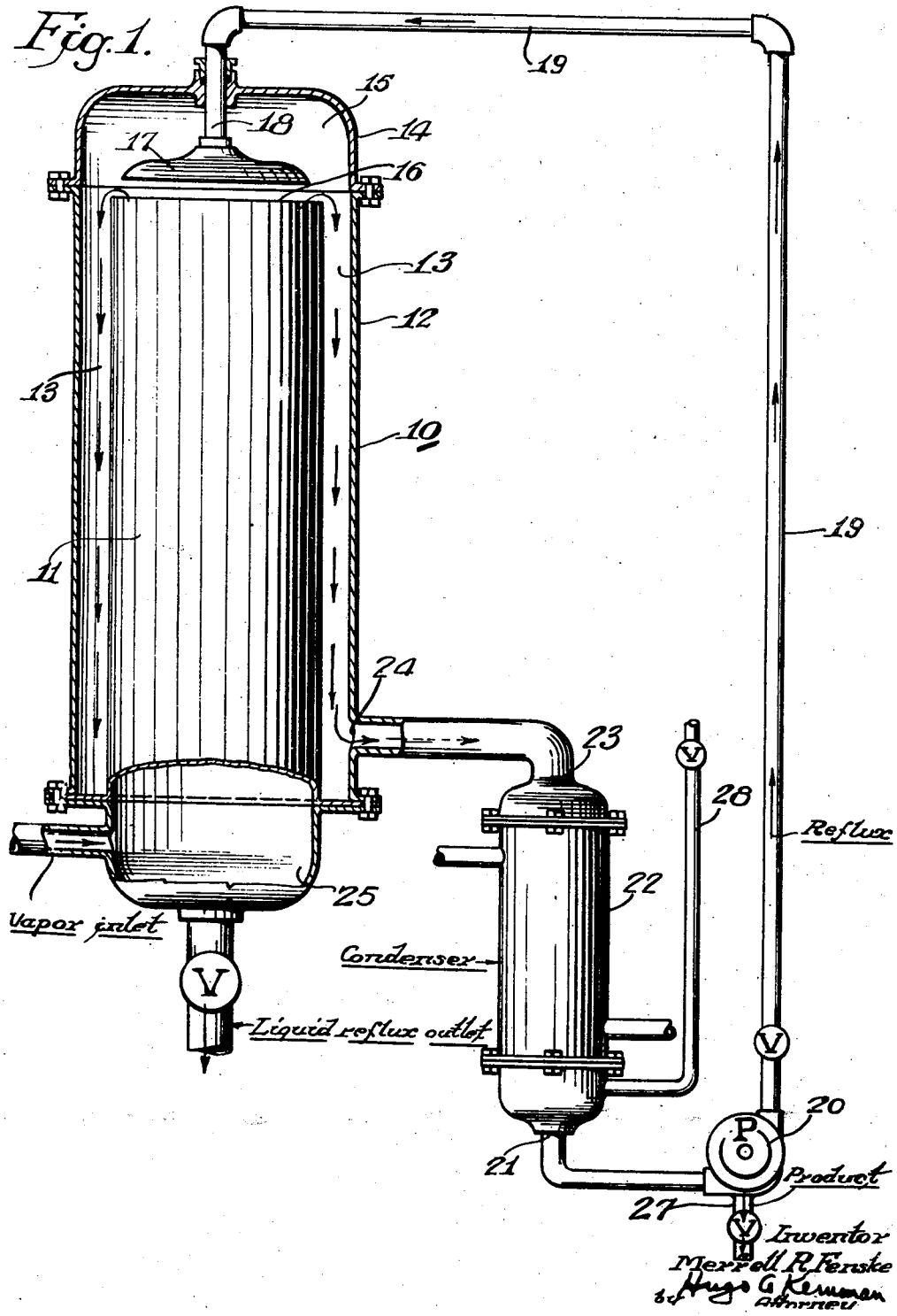

March 28, 1944.　　M. R. FENSKE　　2,344,984
PROCESS AND APPARATUS FOR FRACTIONAL DISTILLATION
Filed July 17, 1940　　2 Sheets-Sheet 1

March 28, 1944. M. R. FENSKE 2,344,984
PROCESS AND APPARATUS FOR FRACTIONAL DISTILLATION
Filed July 17, 1940 2 Sheets-Sheet 2

Inventor:—
Merrell R. Fenske
Hugo G. Kenman
By Attorney

UNITED STATES PATENT OFFICE 2,344,984

PROCESS AND APPARATUS FOR
FRACTIONAL DISTILLATION

Merrell R. Fenske, State College, Pa., assignor to
The Pennsylvania Research Corporation, a corporation of Pennsylvania Application July 17, 1940, Serial No. 345,884

8 Claims. (Cl. 196—94)

This application is a continuation-in-part of my copending application Serial Number 157,925, filed August 7, 1937 which has matured into Patent Number 2,208,573, dated July 23, 1940.

In fractional distillation, particularly as practiced on the plant scale wherein fractionating columns of considerable size are employed, considerable loss in through-put and efficiency are occasioned by heat exchange with the atmosphere despite the application of heat insulation to exposed surfaces. These losses are due to the inability to cause the fractionating column to operate under conditions more nearly approaching adiabatic conditions.

This difficulty is also experienced in the laboratory when it is desired to make close separations and has led to the expedient of wrapping columns with resistance wire for temperature control through electrical circuits when the fractionation takes place at temperatures above room temperature.

The opposite of this which is applicable when distillations take place at temperatures below room temperature, such as in the fractionation of liquid air, is to replace the resistance wire with tubular coils for the circulation of cooled brine or for the direct expansion of a suitable refrigerant, such as takes place, for instance, in direct refrigeration processes.

In either case, that is, whether heat or cold is applied to the exterior surface of the fractionating column, the object is to hold the temperature through control means approximately at temperatures along the column which would obtain if there were no heat exchange with the column. The desideratum is to maintain the temperature gradient between the column and its exterior at a virtual minimum.

Expedients of this character are for the most part limited to the laboratory since their application to commercial types of columns involves considerable expenditures in time, labor and materials. Even in the case of large laboratory columns, this is not a negligible item.

The cost of operation, particularly in the case of difficult separations in commercial or semi-commercial columns, might be very considerable.

In seeking to overcome the foregoing difficulties, I have discovered that the heat gradient between a column and its exterior may be very substantially reduced if not actually brought to a virtual minimum by causing the rectified vapors leaving the column and prior to their condensation to enclose the fractionating zone of the column while passing on their way to the condenser.

By causing the rectified vapors to enclose the fractionating zone of the column, heat exchange between the fractionating zone and its exterior is very substantially reduced if not for practicable purposes eliminated. This procedure is particularly desirable and efficient when close boiling components are being separated.

An outstanding advantage of my method when distillation takes place at temperatures above atmospheric is that any heat exchange between the rectified vapors and the atmosphere has no substantial effect upon the heat gradient between the fractionating zone of the column and the rectified vapors, since it is necessary to condense a considerable part or substantially all of the rectified vapors before any marked temperature reduction is possible.

Thus the latent heat of vaporization of the rectified vapors is made available as a highly efficient buffer to compensate for any heat exchange with the atmosphere without any substantial change in the temperature gradient between the fractionating zone and its immediate surroundings.

While the heat of vaporization is not made available for this purpose when distillation takes place at sub-atmospheric temperatures, my process is nevertheless distinctly advantageous since the rectified vapors are capable of considerable quantitative loss or gain of sensible heat without a material change in temperature because of their considerable volume.

It will be noted that the vapor volume is independent of the reflux ratio and in the case of adiabatic fractionation is determined substantially solely by the heat input into the still-pot or reboiler.

Figure 2:
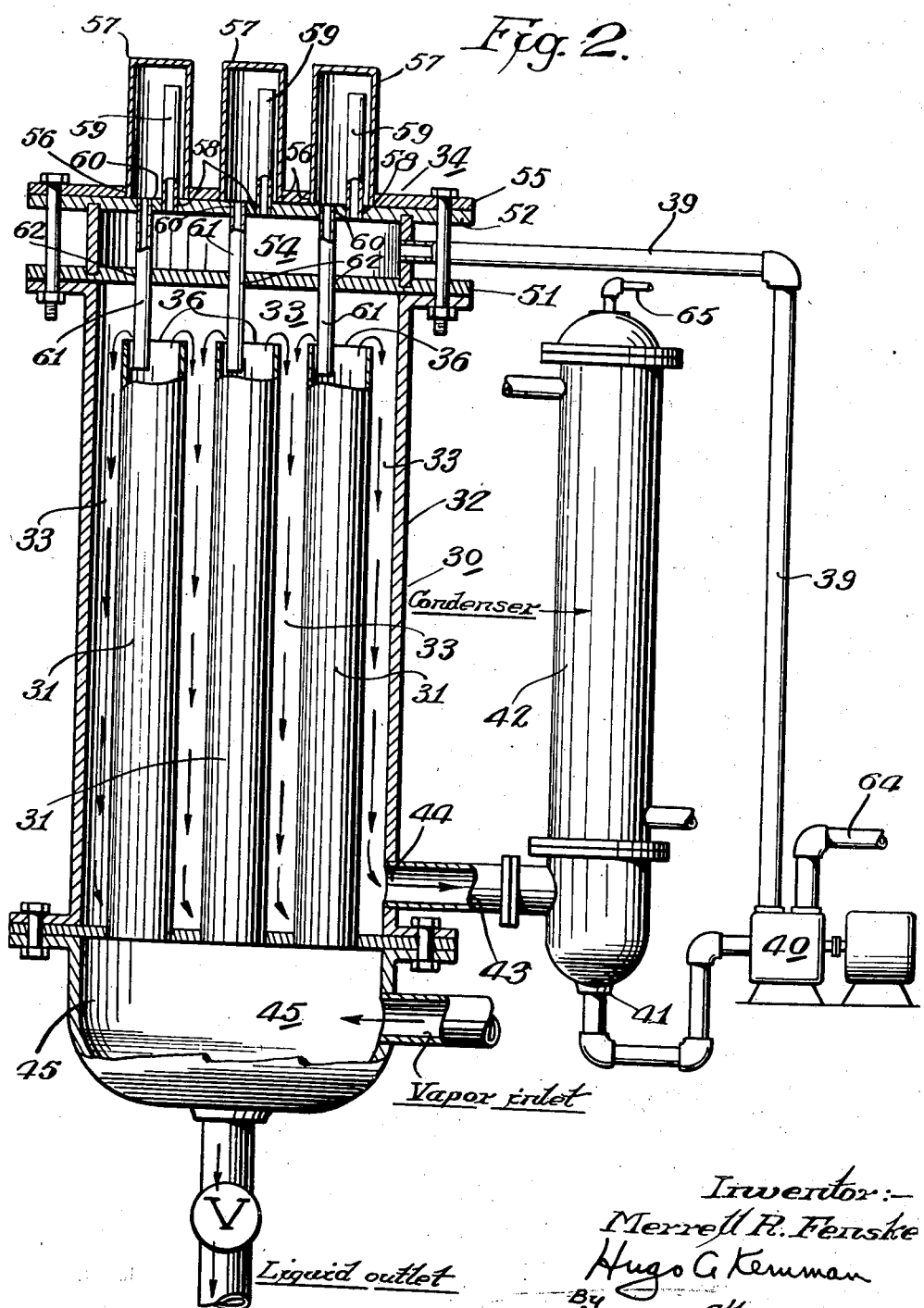

Further features of the invention reside in the steps, combinations and sequences of steps, and in the construction, arrangement of and combination of parts, all of which together with other features will become more apparent to persons skilled in the art upon becoming familiar herewith and upon reference to the drawings in which:

Figure 1 is a sectional elevation illustrating a conventional fractionating column having my invention applied thereto; and Figure 2 is a sectional elevation of a column of the multi-tubular type having my invention applied thereto.

Referring now more particularly to Figure 1, at 10 is shown a column of which 11 is the fractionating zone.

Fractionating zone 11 has been illustrated without any interior construction since this may take any conceivable form for the countercurrent contact of an ascending vapor phase with a descending liquid phase for the purpose of fractionation.

Engineering details have also been omitted since these are capable of wide variation and will occur to persons skilled in the art upon becoming familiar herewith.

Fractionating zone 11, as illustrated, is surrounded by a shell 12 of somewhat larger diameter thus forming a circumferential or annular space 13 therebetween.

Shell 12 is shown provided with a dome or cap 14, the interior 15 of which forms an open space above the top of fractionating zone 16 and communicates with space 13.

Extending downwardly into space 15 is a spray device 17 for the delivery of reflux liquid to fractionating zone 11, spray 17 being connected to a pipe 18 which extends through dome 14 and connects to pipe 19 leading from pump 20.

Pump 20 is connected to the outlet 21 of condenser 22 the inlet 23 of which is connected to opening 24 in shell 12 adjacent the bottom of the latter.

A vapor phase feed and liquid phase withdrawal chamber 25 is connected to the bottom of column 10 and communicates with the interior of fractionating zone 11.

In operation vapors to be fractionated leaving from any source enter chamber 25 and pass up into fractionating zone 11 where they are countercurrently contacted with liquid reflux supplied through spray 17.

As previously pointed out the phase contacting means in fractionating zone 11 may take the form of any of the wide variety known in the art.

Common examples are the bubble cap construction and the packed arrangement. Further details as well as other examples may be had upon referring to the vast amount of literature and patents on this particular subject.

As a result of the countercurrent contact in fractionating zone 11, the ascending vapors are rectified and upon rectification pass upwardly out of the top 16 of fractionating zone 11. The rectified vapors descend through annular space 13 about the outside of fractionating zone 11, thus forming a heat exchange buffer between the fractionating column 11 and the shell 12.

The rectified vapors then pass out through opening 24 into condenser 22 in which, as illustrated, they are totally condensed.

Condensate from condenser 22 flows into metering pump 20 which returns a part through line 19 to spray 17 as reflux and withdraws another part which flows through line 27 as product.

Any condensate which might be formed in annular space 13 will collect in the bottom thereof and flow out through opening 24 into condenser 22 to be added to the condensate formed in condenser 22.

While heat insulation may be added to the exterior of shell 12, if desired, and likewise to the exterior of dome 14 and other parts of the apparatus, my invention makes it possible to reduce the extent of any such insulation, if desired, and, in many cases, to omit it entirely without greatly increasing the heat gradient between the fractionating zone and its immediate surroundings.

Since the latent heat of vaporization must be removed from the rectified vapors descending through annular space 13 before the temperature in annular space 13 can be very materially reduced, it will be seen that shell 12 might be made to function as an atmospheric temperature condenser thus relieving condenser 22 of a part of the condensing load.

It will be understood, of course, that liquid reflux after passing down through fractionating zone 11 passes down through chamber 25 from which it may be led to any desired point such as back to the still-pot or reboiler, or to another fractionating column.

Obviously fractionating zone 11 may be operated under any desired pressure for which purpose I have illustrated a vent 28 leading from the bottom of condenser 22, which may be open to the atmosphere in the event of fractionation at atmospheric pressure, or may be connected to pressure regulating mechanism for fractionating either at sub-atmospheric or super-atmospheric pressure.

The particular description of Figure 1 was given for the purposes of illustration and it is to be understood that the invention may be applied to any type of fractional distillation either for the purposes of enrichment or stripping, or otherwise, and may be embodied in any type, form configuration, or construction of apparatus.

In some cases, for example, when the temperature difference between the top and bottom of fractionating section 11 is relatively large, say of the order of 50° or more, it may be desirable to provide section 11 with some insulating means such as by applying heat insulating materials or a dead-air space to the outside of section 11 in order to reduce heat exchange between the inside of 11 and the vapors in annular space 13.

Further adaptations of the invention will occur from time to time to persons skilled in the art upon becoming familiar herewith.

One such adaptation which is of particular interest because it in turn involves a problem peculiar to the type of equipment involved, is the embodiment of the invention in a multi-tubular column.

This is illustrated in Figure 2 in which at 30 is shown a column having a plurality of fractionating zones 31 arranged in parallel.

These fractionating zones have been illustrated without any interior construction since this, as in the case of fractionating zone 11, may take any conceivable form for the counter-current contact of an ascending vapor phase with a descending liquid phase for the purposes of fractionation.

At present packing such as jack chain, Raschig rings, small wire forms, etc., are largely used for packing multi-tubular columns though as above pointed out, any other material may be substituted.

Furthermore, any other type of fractionating unit might be employed, such as the bubble plate construction, rotating mechanical devices, specialized forms of packing, etc.

For this reason engineering details have been omitted.

Fractionating zones 31, as illustrated, are surrounded by a shell 32 in a manner to form a space between the fractionating zones and the shell as well as between the fractionating zones themselves. The aggregate space will be referred to for convenience as space 33.

A cap construction 34, which will be hereinafter more particularly described, is shown at the top of shell 32 to close the space 33 at the top, the construction being such as to leave the tops 36 of fractionating zones 31 open to the space 33.

Cap 34 is designed to meter reflux liquid in proportionate quantities into the individual fractionating zones 31 and is connected through pipe 39 to proportioning pump 40.

Pump 40 is connected to the outlet 41 of condenser 42, the inlet 43 of which is connected to opening 44 in shell 32 adjacent the bottom of the latter.

A vapor phase feed and liquid phase withdrawal chamber 45 is connected to the bottom of column 30 and communicates with the fractionating zones 31 at their lower ends.

Returning now to cap 34, spaced plates 51 and 52 have interposed therebetween a shell 53 to form a reflux feeding chamber 54. A plate 55 is positioned upon plate 52 and has a plurality of apertures 56 in each of which is secured the open end of a tube 57. Each tube 57 has its top end closed. Plate 52 is provided with a plurality of apertures 58 each of which supports the lower end of a proportioning tube 59. The arrangement is such that each proportioning tube 59 extends upwardly into a separate tube 57.

Plate 52 is also provided with a plurality of apertures 60 of the same number as the tubes 57 and 59 as well as the same number as fractionating units 31.

Depending from each aperture 60 is a reflux drain tube 61 which extends downwardly through a separate aperture 62 in plate 51 and into a separate fractionating unit 31.

It will be understood that any other construction might be substituted.

The operation of the form of the invention shown in Figure 2 is as follows:

Vapors from any source, such as a still-pot or reboiler, enter chamber 45 and are proportioned between the various fractionating units 31. If the fractionating units 31 are substantially matched as to pressure drop, the vapors will divide substantially equally between the various fractionating units. According to the theory under which multi-tubular columns operate this is a desired feature, particularly if as is usual the fractionating units are of similar construction.

The proportioning of the vapors between the various fractionating units 31 may, of course, be accomplished otherwise, such as by metering devices or as might be the case, depending upon the efficiency desired, this feature might be neglected.

The vapors to be fractionated ascend through the fractionating units 31 and are contacted therein by descending liquid phase reflux, and rectified vapors escape from the tops 36 of fractionating units 31.

The rectified vapors then descend through space 33 and thus enclose the fractionating units 31, flow off through opening 44 to condenser 42 wherein in the apparatus as illustrated, they are totally condensed.

Condensate flows from outlet 41 of condenser 42 to proportioning pump 40 from which a part may be taken off through line 64 as product and the rest returned through line 39 to the reflux proportioning cap 34.

Liquid reflux enters chamber 54 wherein it is divided by flowing up through proportioning tubes 59 contained within the tubes 57. The reflux liquid is then conducted downward through tubes 61 into the tops of fractionating units 31.

If desired, tubes 61 may be provided at the lower end with cups so as to form a liquid seal to prevent vapors from ascending through these tubes. The cups enable liquid to flow out of tubes 61 into fractionating units 31 but prevent the inflow of vapors.

The liquid reflux flows downwardly through fractionating units 31 and is contacted therein by the ascending vapors.

The liquid reflux leaving the bottoms of fractionating units 31 collects in chamber 45 and is withdrawn therefrom either continuously, continually, intermittently, or otherwise, and conducted to a desired point (not shown) such as back to the still-pot or reboiler.

A vent is shown at 65 at the top of condenser 42 which may open to the atmosphere or to which pressure regulating mechanism might be attached for operation at sub-atmospheric, atmospheric, or super-atmospheric pressure, as desired.

Any condensate formed in space 33 drains through opening 44 into the bottom 41 of condenser 42.

As in the case of Figure 1, the particular construction illustrated is for the purposes of illustration and the column illustrated may be modified to adapt it to any type of fractionation. Furthermore, any other type, form, configuration, or construction might be substituted.

The vapors descending through space 33 minimize the heat gradient between the fractionating units 31 and their immediate exterior.

Furthermore, by having the space 33 common to all the fractionating units 31, there is a tendency to maintain the exterior temperature of each of the fractionating units 31 the same which is of importance when it is desired to make very fine or close separations.

If desired, however, for any reason the construction might be modified so as to conduct the rectified vapors from each individual fractionating unit 31 down around that particular fractionating unit. This might be accomplished, for example, by providing each fractionating unit 31 with a separate casing with its top end closed and its bottom end open to the space 33.

The use of the fractionated vapors to enclose or insulate thermally the tubes 31 in a multi-tubular fractionating column is especially important, for without such adequate insulation, the outermost row or ring of tubes 31 is subjected primarily to the loss of heat, but in so doing they protect the inner tubes from heat loss and make conditions therein virtually adiabatic. But this heat loss from the outer row of tubes upsets their fractionating ability and causes uneven distribution between the vapor and liquid quantities flowing in all such tubes 31. The use of the fractionated vapors in space 33 to jacket the tubes avoids this heat loss from the outer tube row or ring, and very materially increases the smoothness and efficiency of operation of all such multi-tubular fractionating devices. These benefits are strictly in addition to the others occurring as already outlined. The above are peculiar to multitubular columns.

The construction shown in Figure 2 for multi-tubular columns is especially desirable, for complex fabrication problems are avoided. The problems of the uneven expansion of the tubes are also eliminated, for the tubes are all free and not confined in a tube sheet at their upper ends. The tubes may now be light weight in construction for the outermost shell 32 may be designed to withstand any pressure, corrosion, or temperature conditions, instead of requiring each tube 31 to meet such conditions. In other words, there is now no material temperature or pressure stress between the inside and outside of tubes 31.

Many other modifications will occur to persons skilled in the art upon becoming familiar herewith. For example, it may be desirable to apply some heat insulating material, such as heat resistant tape or sleeving, to the outside of the tubes to reduce exchange of heat between the inside of the tubes and the vapors in space 33. This applies particularly if tubes 31 are relatively small in diameter, say 1 inch or less.

As an example of the efficacy of the foregoing methods for rendering adiabatic the fractionating section of distillation columns, the following results are given relating to a 7-inch diameter multitube column, 30 feet tall. This column has the equivalent of 75 to 80 theoretical plates. When fractionating gasoline hydrocarbons boiling about 150° C. to 200° C., the heat loss from the well-insulated column is about 8000 B. t. u. per hour. In order that the column operate at its maximum throughput and efficiency, electrical energy equivalent to this 8000 B. t. u. per hour heat loss needs to be supplied to the column by means of an electrical resistance winding. The throughput, or amount of vapors flowing through the column, may be measured from the B. t. u. picked up by the condenser. In operation at about 150° C. about 12,000 B. t. u. per hour are absorbed in the condenser by condensing vapors. These vapors are generated in an electrically heated still. This liquid condensate is collected, and part is returned to the column as reflux while the remainder comprises the product. By providing the column with a jacket through which the vapors may be conducted on their way to the condenser, the need for the additional 8000 B. t. u. per hour is eliminated. Consequently, the heating load, or the heat requirement of the fractionating apparatus, was reduced to about 60 per cent of its former value, and the electrical heating of the column may be dispensed with, by so doing.

In general, my method of maintaining distillation columns substantially adiabatic is increasingly desirable the greater the potential heat loss from the column, the greater the mass of vapor flowing therethrough, and the more difficult the fractional distillation being conducted in the column.

The invention is particularly useful as affording an additional tool for use in solving the problem of separating crude petroleum, or fractions thereof, into their constituents. Although crude petroleum, for example, has a very wide boiling range and contains materials of a wide variety of vapor pressures ranging from relatively high to relatively low, yet, apparently because of the presence of such a large number of different hydrocarbons, there appears to be no hydrocarbon whose vapor pressure is distinct. As a result separations and positive identifications have been limited for the most part to the lower molecular weight hydrocarbons present.

By applying my invention to the already highly efficient fractionating columns employed in this work separations previously made can be more easily effected and the field for future work considerably extended.

From the foregoing it will be seen that I have provided a highly efficient method and apparatus for minimizing the heat gradient between fractionating columns or units and their immediate exterior, and while I have described the invention in connection with given types of columns, it is to be understood that it may be adapted to any type of column regardless of its construction. This includes columns which are built in sections, or otherwise.

Having described my invention, it is to be understood that changes, omissions, additions, substitutions and/or modifications might be made within the scope of the claims without departing from the spirit thereof.

I claim:

1. In a process for the fractionation of petroleum hydrocarbons in which an ascending vapor phase is intimately and countercurrently contacted with a descending liquid phase in a fractionating zone for purposes of fractionation, the step of bringing rectified vapors produced in said fractionating zone into heat exchange relationship with substantially the entire outside circumferential walls of said fractionating zone to substantially reduce the heat gradient between said fractionating zone and its immediate exterior.

2. In a process for the fractionation of a mixture having components of different volatilities in which an ascending vapor phase is intimately and counter-currently contacted with a descending liquid phase for purposes of fractionation, the steps of forming and maintaining said phases in a plurality of separate streams, contacting each stream of one phase with a separate stream of the other phase in a separate phase contacting path, and bringing the rectified vapors produced by said phase contacting paths into heat exchange relationship circumferentially with substantially the entire outsides of said phase contacting paths to substantially reduce the heat gradient between said phase contacting paths and their immediate surroundings.

3. In a process for the fractionation of a mixture having components of different volatilities in which an ascending vapor phase is intimately and counter-currently contacted with a descending liquid phase in a phase contacting path for purposes of fractionation, the step of bringing the rectified vapors produced by said phase contacting path into heat exchange relationship with substantially the entire outside circumferential walls of said phase contacting path to substantially reduce the heat gradient between said phase contacting path and its immediate surroundings.

4. A fractionating column for the fractionation of a mixture having components of different volatilities in which a vapor phase is countercurrently contacted with a liquid phase, comprising means for forming and maintaining said phases in a plurality of separate streams, means within said column for contacting each stream of one phase with a separate stream of the other phase in a separate phase contacting path, and means for bringing the rectified vapors produced by said phase contacting paths into heat exchange relationship with the outsides of said phase contacting paths.

5. A fractionating column for the fractionation of a mixture having components of different volatilities in which a vapor phase is counter-currently contacted with a liquid phase, comprising a plurality of phase contacting paths, and means for bringing rectified vapors produced by said phase contacting paths into heat exchange relationship with the outside of said phase contacting paths to substantially reduce the heat gradient between said phase contacting paths and the immediate surroundings.

6. A fractionating column comprising a plurality of spaced tubular fractionating zones, means for fixedly supporting each of said tubular fractionating zones at one point thereby leaving said fractionating zones free from fixed support at other points, means for encasing said fractionating zones, means for delivering vapors to be fractionated to the lower ends of said fractionating zones, means for delivering liquid phase reflux to the tops of said fractionating zones, means for conducting rectified vapors into said encasing means adjacent the upper ends of said fractionating zones, and means for withdrawing rectified vapors from said encasing means adjacent the lower ends of said fractionating zones.

7. A fractionating column comprising a plurality of spaced tubular fractionating zones, means for fixedly supporting each of said tubular fractionating zones solely adjacent the lower end thereof thereby leaving said fractionating zones free from fixed support at the upper ends thereof, means for encasing said fractionating zones, means for delivering vapors to be fractionated to the lower ends of said fractionating zones, means for delivering liquid phase reflux to the tops of said fractionating zones, means for conducting rectified vapors into said encasing means adjacent the upper ends of said fractionating zones, and means for withdrawing rectified vapors from said encasing means adjacent the lower ends of said fractionating zones.

8. In a process for the fractionation of a mixture having components of different volatilities in which an ascending vapor phase is intimately and countercurrently contacted with a descending liquid phase for purposes of fractionation, the steps of forming and maintaining said phases in a plurality of separate streams, contacting each stream of one phase with a separate stream of the other phase in a separate phase contacting path, combining the rectified vapors produced by said phase contacting paths, and bringing said combined rectified vapors into heat exchange relationship with the outsides of said phase contacting paths within an enclosure common to all of said paths to substantially reduce the heat gradient between said phase contacting paths and the exterior.

MERRELL R. FENSKE.